(12) United States Patent
Lin et al.

(10) Patent No.: US 9,438,872 B2
(45) Date of Patent: Sep. 6, 2016

(54) PROJECTION DISPLAY SYSTEM AND METHOD FOR CORRECTING PROJECTION REGION

(71) Applicants: Wei-Lun Lin, Hsin-Chu (TW); Jui-Chi Chen, Hsin-Chu (TW); Jyun-Lin Cian, Hsi-Chu (TW)

(72) Inventors: Wei-Lun Lin, Hsin-Chu (TW); Jui-Chi Chen, Hsin-Chu (TW); Jyun-Lin Cian, Hsi-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 96 days.

(21) Appl. No.: 14/489,480

(22) Filed: Sep. 18, 2014

(65) Prior Publication Data

US 2016/0088276 A1     Mar. 24, 2016

(51) Int. Cl.
*H04N 9/31* (2006.01)
*G03B 21/13* (2006.01)

(52) U.S. Cl.
CPC .......... *H04N 9/3185* (2013.01); *H04N 9/3147* (2013.01); *H04N 9/3179* (2013.01); *H04N 9/3188* (2013.01); *H04N 9/3194* (2013.01); *G03B 21/13* (2013.01)

(58) Field of Classification Search
CPC ............. H04N 9/3147; H04N 9/3185; H04N 9/3197; G06T 5/00; G06T 5/006; G06T 5/50; G03B 37/04
See application file for complete search history.

(56) References Cited

U.S. PATENT DOCUMENTS

| | | | |
|---|---|---|---|
| 6,456,339 B1 | 9/2002 | Surati et al. | |
| 6,733,138 B2 * | 5/2004 | Raskar | H04N 9/12 345/32 |
| 2003/0156262 A1 * | 8/2003 | Baker | H04N 9/3147 353/31 |
| 2008/0118178 A1 * | 5/2008 | Way | G06F 3/1446 382/275 |
| 2008/0246781 A1 * | 10/2008 | Surati | H04N 5/74 345/690 |
| 2008/0266321 A1 * | 10/2008 | Aufranc | G03B 21/26 345/626 |
| 2012/0320042 A1 | 12/2012 | Green et al. | |

FOREIGN PATENT DOCUMENTS

CN           101930724           12/2010

* cited by examiner

*Primary Examiner* — Sultan Chowdhury
(74) *Attorney, Agent, or Firm* — Jianq Chyun IP Office

(57) ABSTRACT

A projection display system and a correcting method are provided. The projection display system includes a plurality of projection devices, an image capturing device, a blending device and computing device. The projection devices are configured to project a plurality of projection regions to a projection surface. The image capturing device is configured to capture an image on the projection surface. The computing device determines locations of the projection regions according to the image captured by the imaging capture device. A display screen of the computing device is configured to display a control interface including a display screen region proportionally corresponding to the projection regions. The computing device dynamically adjusts a projection ratio of an image frame displayed on the projection region by adjusting locations of control points on the display screen region and a space between the control points.

15 Claims, 6 Drawing Sheets

PROJECTION DISPLAY SYSTEM AND METHOD FOR CORRECTING PROJECTION REGION

BACKGROUND

1. Technical Field

The invention relates to a projection system, and particularly relates to a projection display system having a plurality of projection devices and a method for correcting projection region.

2. Related Art

Since it is still difficult to manufacture a large size display, when a large size image is required to be shared with people to satisfy an acousto-optic effect, a plurality of projection devices and a main control machine can be used to implement image blending, so as to project the content to be shared. In this way, a wider screen effect is presented, and a brightness and color performance of the projection screen can be enhanced by increasing the number of the projection devices. A user can also manually adjust a required imaging effect through software or a control interface provided by the main control machine. Patents related to a screen blending technology implemented through a plurality of projectors include U.S. Patent Publication No. US 20120320042, U.S. Pat. No. 6,456,339 and China Patent Publication No. CN 101930724.

However, the spliced imaging frame is probably warped due to that a projection surface whereon the projector projects the image is not a plane (for example, the projector projects the image on an arc projection screen, a wave-shaped projection screen or an irregular projection screen). On the other hand, when a plurality of projectors is used for image blending, the imaging frame inevitably has a bright band due to that an overlap range of the projection regions exceeds a predetermined size, which decreases a projection quality of the imaging frame. Therefore, many manufacturers devote to resolve the problems occurred in image blending to improve the image blending technology of multiple projectors.

SUMMARY

Accordingly, the invention is directed to a projection display system and a method for correcting projection region. In the projection display system, a plurality of functions used for adjusting the projection regions is additionally added on a control interface of a computing device, such that a user is capable of operating the control interface of the computing device to avoid decrease of projection quality caused by improper adjustment of an image capturing position or a projector position.

Other objects and advantages of the invention can be further illustrated by the technical features broadly embodied and described as follows.

In order to achieve one or a portion of or all of the objects or other objects, an embodiment of the invention provides a projection display system including a plurality of projection devices, an image capturing device, a blending device and a computing device. The projection devices are configured to project a plurality of projection regions to a projection surface, respectively, and the projection regions are adjacent to or partially overlapped to each other. The image capturing device is configured to capture the projection regions on the projection surface. The computing device determines locations of the projection regions according to the projection regions captured by the image capturing device. The computing device includes a display screen. The display screen is configured to display a control interface including a display screen region. The display screen region proportionally corresponds to the projection regions. A plurality of control points is set on the display screen region, and the computing device dynamically adjusts a projection ratio of an image frame displayed on the projection regions by adjusting locations of the control points and a space between the control points on the display screen region.

In an embodiment of the invention, the display screen region has a plurality of regions, the regions are defined by a plurality of horizontal lines and a plurality of vertical lines, and the control points are set at intersections of the horizontal lines and the vertical lines.

In an embodiment of the invention, the blending device further includes a memory unit configured to store at least one two-dimensional (2D) coordinate array; a signal output unit configured to output an image signal; and an image control unit coupled to the signal output unit and the memory unit. The image control unit generates a plurality of warped images according to an input image and the at least one 2D coordinate array, and controls the signal output unit to output the warped images to the projection devices.

In an embodiment of the invention, the smaller the computing device adjusts the space between two control points on the display screen region to be, the smaller the projection ratio of the corresponding region in the projection regions is; and the greater the computing device adjusts the space between two control points on the display screen region to be, the greater the projection ratio of the corresponding region in the projection regions is.

An embodiment of the invention provides a method for correcting projection region, which includes following steps. A plurality of projection regions of a plurality of projection devices is respectively projected to a projection surface, and the projection regions on the projection surface are captured to determine locations of the projection regions, and the projection regions are adjacent to or partially overlapped to each other. In a control interface, a plurality of control points is respectively set on a display screen region of the control interface, where the display screen region proportionally corresponds to the projection regions. A projection ratio of an image frame displayed on the projection regions is dynamically adjusted by adjusting locations of the control points and a space between the control points.

In an embodiment of the invention, the step of a plurality of control points respectively set on a display screen region of the control interface includes: the display screen region has a plurality of regions defined by a plurality of horizontal lines and a plurality of vertical lines, and the control points are set at intersections of the horizontal lines and the vertical lines.

In an embodiment of the invention, the step of dynamically adjusting a projection ratio of the image frame displayed on the projection regions includes: the smaller the space between two control points on the display screen region is, the smaller the projection ratio of the corresponding region in the projection regions is; and, the greater the space between two control points on the display screen region is, the greater the projection ratio of the corresponding region in the projection regions is.

An embodiment of the invention provides a projection display system including a plurality of projection devices, an image capturing device, a blending device and a computing device. The projection devices are configured to project a plurality of projection regions to a projection surface and the projection regions are partially overlapped to each other. The image capturing device is configured to capture the projection regions on the projection surface. The computing device determines locations of the projection regions according to the projection regions captured by the image capturing device. The computing device includes a display screen. The display screen is configured to display a control interface including a display screen region. The display screen region proportionally corresponds to the projection regions. A boundary of an overlapped portion of the projection regions is indicated in the display screen region, and the computing device adjusts an image frame at the overlapped portion between the projection regions according to the boundary.

In an embodiment of the invention, a projection brightness of each of the projection regions on the projection surface is progressively decreased from the internal boundary of each overlapped portion to internal.

In an embodiment of the invention, adjustment of the image frame at the overlapped portion between the projection regions does not exceed the internal boundary.

In an embodiment of the invention, the blending device further includes a memory unit configured to store at least one 2D coordinate array; a signal output unit configured to output an image signal; and an image control unit coupled to the signal output unit and the memory unit. The image control unit generates a plurality of warped images according to an input image and the at least one 2D coordinate array, and controls the signal output unit to output the warped images.

An embodiment of the invention provides a method for correcting projection region, which includes following steps. A plurality of projection regions of a plurality of projection devices is respectively projected to a projection surface, and the projection regions on the projection surface are captured to determine locations of the projection regions. The projection regions are partially overlapped to each other. Internal boundaries of an overlapped potion of the projection regions are indicated on a display screen region of a control interface, and the display screen region proportionally corresponds to the projection regions. The overlapped portion between the projection regions is adjusted according to the internal boundaries.

According to the above descriptions, the computing device of the embodiment of the invention can add a plurality of control points and internal boundaries of the overlapped portion of the projection regions on the display screen region of the control interface, such that the user can use the control points used for controlling the projection ratio to manually adjust the warped image caused by a non-planar projection screen (for example, an arc or wave-shaped projection screen). The user can also adjust the imaging frame on the projection regions according to the internal boundaries of the overlapped portion of the projection regions, so as to avoid unexpected image bright band. In this way, the user can dynamically adjust the imaging frame on the projection regions through the additionally increased functions on the control interface, so as to improve the projection quality.

The embodiment of the invention is to use a plurality of projection devices to project a high quality image on a large size screen.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

The present invention will now be described more fully with reference to the accompanying drawings, in which exemplary embodiments of the invention are shown. The terms used herein such as "above", "below", "front", "back", "left" and "right" are for the purpose of describing directions in the figures only and are not intended to be limiting of the invention.

In order to maintain a projection quality of an image frame obtained by blending a plurality of projection regions, an embodiment of the invention provides a projection display system. The projection display system may set control points of the projection regions on a control interface or indicate a boundary of an overlapped portion of the projection regions on the control interface. In this way, a user can dynamically adjust a projection ratio and an overlapping effect of an imaging frame through the control interface, so as to improve the projection quality of the projection display system.

Figure 1:
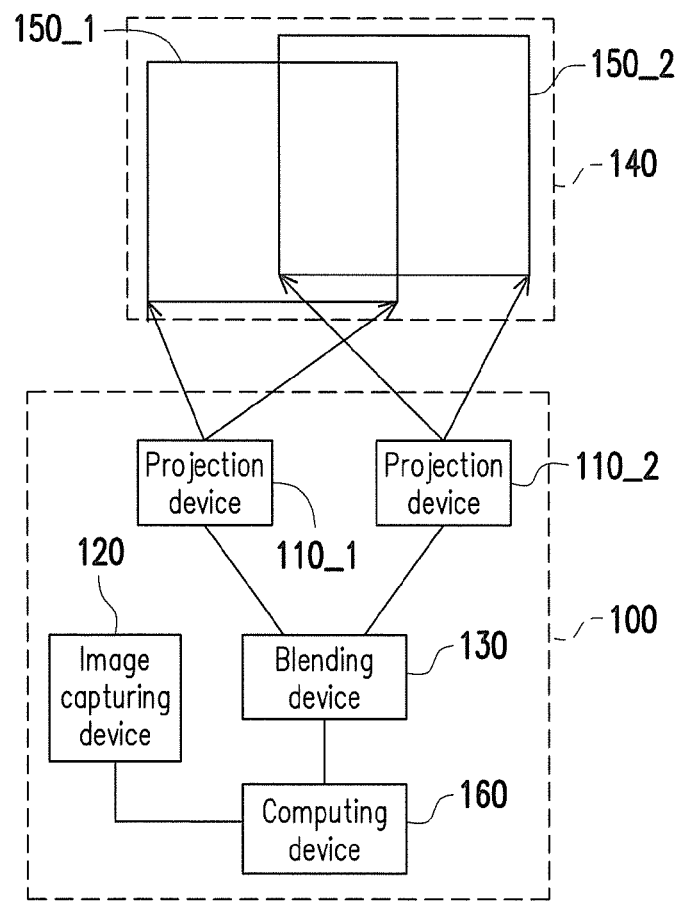
FIG. 1 is schematic diagram of a projection display system according to an embodiment of the invention.

FIG. 1 is schematic diagram of a projection display system 100 according to an embodiment of the invention. Referring to FIG. 1, in the embodiment, the projection display system 100 includes projection devices 110_1 and 110_2, an image capturing device 120, a blending device 130 and a computing device 160. The projection devices 110_1 and 110_2 are, for example, devices capable of projecting images such as optical projectors or digital projectors, etc. In FIG. 1, the projection device 110_1 is configured to project images to a projection region 150_1 on a projection surface 140, and the projection device 110_2 is configured to project images to a projection region 150_2 on the projection surface 140. It should be noticed that although the projection display system including two projection devices is used for description, those skilled in the art can deduce other projection display systems having more number of the projection devices according to an actual design requirement with reference of the instructions of the embodiment.

The image capturing device 120 is coupled to the computing device 160. The image capturing device 120 is, for example, a device capable of capturing image information such as a general video camera, a camera or an IP camera, etc. The image capturing device 120 is configured to capture an imaging frame on the projection surface 140. The imaging frame is composed of images projected to the projection region 150_1 and the projection region 150_2.

Figure 2A:
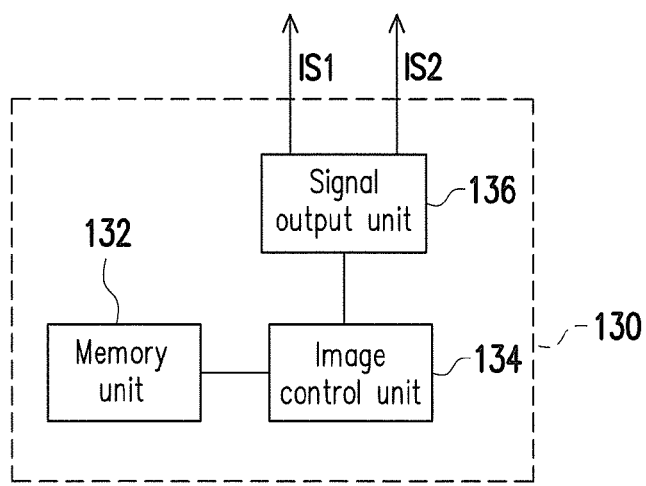
FIG. 2A is a schematic diagram of a blending device according to an embodiment of the invention.

The blending device 130 is coupled to the projection devices 110_1, 110_2 and the computing device 160, and is configured to warp or blend an input image. For example, FIG. 2A is a schematic diagram of a blending device 130 according to an embodiment of the invention. Referring to FIG. 1 and FIG. 2A, in the embodiment, the blending device 130 includes a signal output unit 136, an image control unit 134 and a memory unit 132. The image control unit 134 is coupled to the signal output unit 136 and the memory unit 132. The image control unit 134 of the blending device 130 is coupled to the computing device 160 (not shown), and the image control unit 134 warps an image according to an image source received by the computing device 160 and a two-dimensional (2D) coordinate array stored in the memory unit 132, and respectively outputs image signal IS1 and IS2 to the projection devices 110_1 and 110_2 through the signal output unit 136, so as to produce image frames on the projection regions 150_1 and 150_2. In the embodiment, the image control unit 134 is a processor, and the memory unit 132 is a flash memory. The image source (not shown) providing images can be a computer, a DVD player, a multimedia storage device, a mobile device, etc.

The computing device 160 can be a desktop computer, a notebook computer, or a tablet PC, etc., which has a control interface (displayed on a display), and the control interface may display images captured by the image capturing device 120. The computing device sets a projection boundary through the control interface. In the invention, since the projection boundary is set through the control interface to provide the blending device 130 the final projection boundary without using the image capturing device 120 to capture the projected images or placing test chart and capturing an image of the test chart to provide the final projection boundary to the blending device 130, a correction time is saved.

A correction method of the projection devices of the projection display system 100 of the embodiment includes a correction stage and a display stage, and the correction stage and the display stage are respectively described below.

Figure 2B:
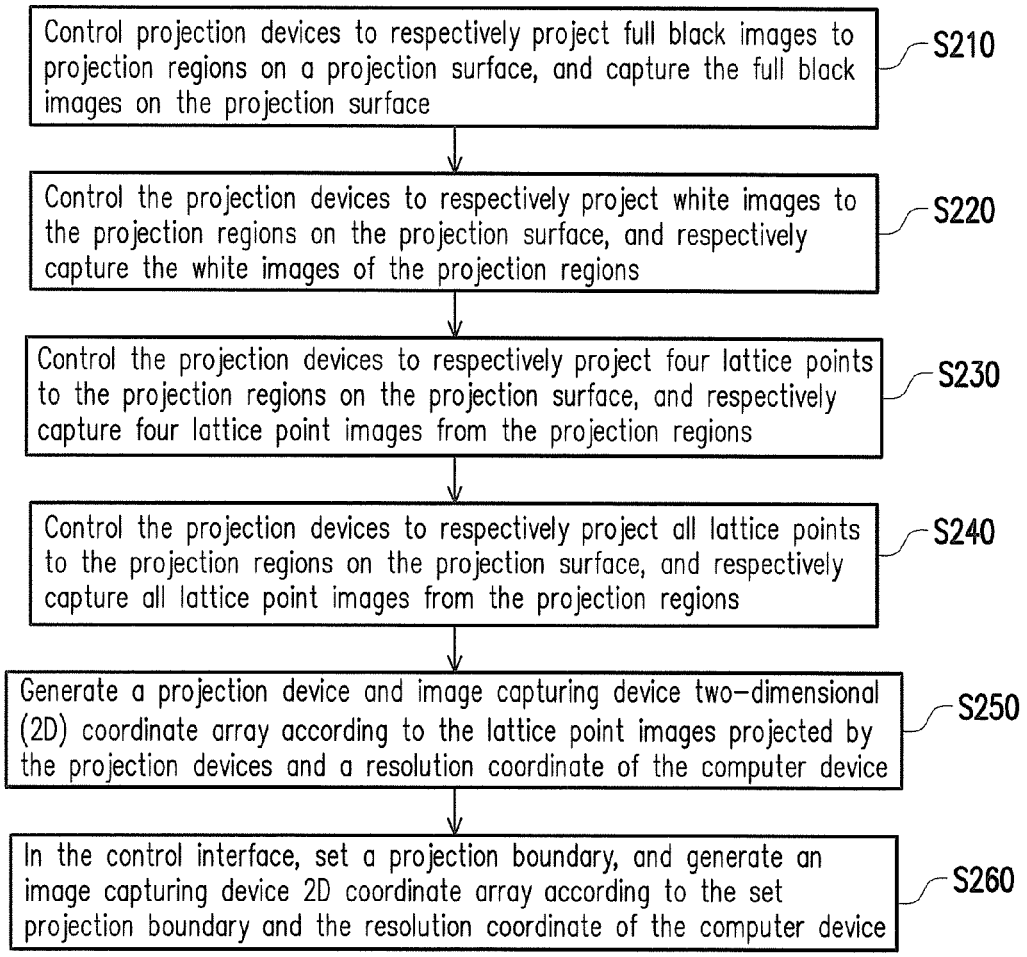
FIG. 2B is a flowchart illustrating a method for correcting projection region according to an embodiment of the invention.

FIG. 2B is a flowchart illustrating a method for correcting projection region according to an embodiment of the invention. Referring to FIG. 1, various steps of the method for correcting projection region are described below with reference of various components in the projection display system 100.

In step S210, the projection devices 110_1 and 110_2 are control to respectively project full black images to the projection regions 150_1 and 150_2 on the projection surface 140, and the image capturing device 120 captures the full black images on the projection surface 140.

In step S220, the projection devices 110_1 and 110_2 are control to respectively project white images to the projection regions 150_1 and 150_2 on the projection surface 140, and the image capturing device 120 respectively captures the white images on the projection regions 150_1 and 150_2.

In step S230, the projection device 110_1 and the projection device 110_2 respectively project four lattice points to the projection regions 150_1 and 150_2 on the projection surface 140, and the image capturing device 120 respectively captures four lattice point images from the projection regions 150_1 and 150_2.

In step S240, the projection device 110_1 and the projection device 110_2 respectively project all lattice points to the projection regions 150_1 and 150_2 on the projection surface 140, and the image capturing device 120 respectively captures all lattice point images from the projection regions 150_1 and 150_2.

In step S250, the computing device 160 generates a projection device and image capturing device 2D coordinate array according to the lattice point images (step S230 to S240) projected by the projection devices 110_1 and 110_2 and captured by the image capturing device 120 and a resolution coordinate of the computer device 160.

In step S260, in the control interface of the computing device 160, a projection boundary is set, and the computing device 160 generates an image capturing device 2D coordinate array according to the set projection boundary and the resolution coordinate of the computer device 160.

The resolution coordinate of the computer device 160 is a resolution of the computing device set by the user, for example, the resolution of the computing device 160 is 400×600, and top left coordinates of the image displayed on the computing device 160 is (0, 0), and bottom right coordinates of the image is (400, 600), though the invention is not limited thereto.

Figure 3:
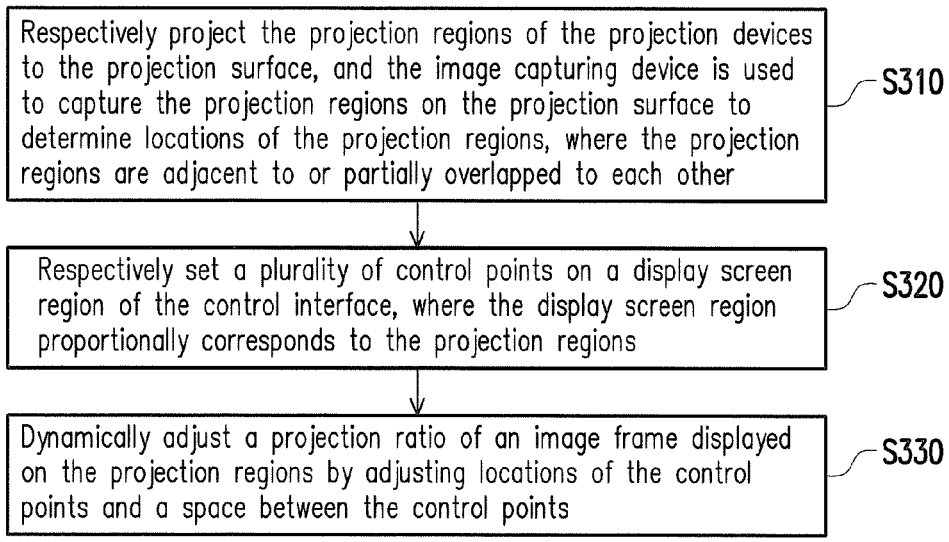
FIG. 3 is a flowchart illustrating a method for correcting projection region according to an embodiment of the invention.

FIG. 3 is a flowchart illustrating a method for correcting projection region according to an embodiment of the invention. Referring to FIG. 1 and FIG. 3, the method for correcting projection region of the embodiment is adapted to the projection display system 100 of FIG. 1, and various steps of the method for correcting projection region of the invention are described below with reference of various components in the projection display system 100.

In step S310, the projection regions 150_1 and 150_2 of the projection devices 110_1 and 110_2 are respectively projected to the projection surface 140, and the image capturing device 120 is used to capture the projection regions 150_1 and 150_2 on the projection surface 140 to determine locations of the projection regions 150_1 and 150_2. The projection regions 150_1 and 150_2 are adjacent to or partially overlapped to each other. The step S310 corresponds to the steps S210-S240, i.e. the images generated in the step S310 are the same to the images generated in the steps S210-S240, and the projectors do not project new images, though the invention is not limited thereto, and new images (different to the images generated in the steps S210-S240) can be projected in the step S310.

In step S320, a plurality of control points are respectively set on a display screen region of the control interface of computing device 160, where the display screen region proportionally corresponds to the projection regions 150_1 and 150_2.

Figure 4A:
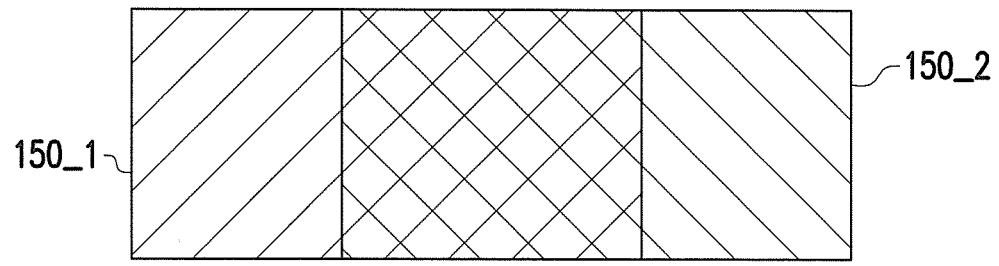
FIG. 4A is a schematic diagram of a projection region according to an embodiment of the invention.
Figure 4B:
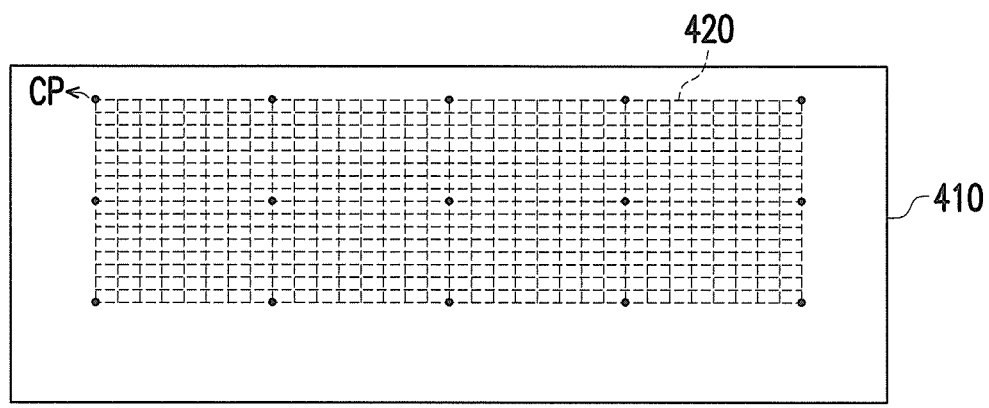
FIG. 4B is a schematic diagram of a display screen region according to an embodiment of the invention.

FIG. 4A and FIG. 4B are used to assist description of the steps of FIG. 3. For example, FIG. 4A is a schematic diagram of a projection region according to an embodiment of the invention. FIG. 4B is a schematic diagram of a control interface 140 according to an embodiment of the invention. In FIG. 4B, a display screen region 420 displayed on the control interface 410 of the computing device 160 proportionally corresponds to the projection regions 150_1 and

150_2. As shown in FIG. 4B, a plurality of horizontal lines and a plurality of vertical lines divide the display screen region 420 on the control interface 410 of the computing device 160 into a plurality of regions, and a plurality of control points CP are set at intersections of the horizontal lines and the vertical lines.

Taking the projection regions 150_1 and 150_2 and the display screen region 420 as an example, in step S330, a projection ratio of an image frame displayed on the projection regions 150_1 and 150_2 is dynamically adjusted by adjusting locations of the control points CP and a space between the control points CP on the display screen region 420 of the control interface 410.

In detail, when the user operates on the control interface 410 to reduce the space between two control points CP on the display screen region 420, the projection ratio of a corresponding region in the projection regions 150_1 and 150_2 is correspondingly reduced. Conversely, when the space between two control points CP is increased, the projection ratio of the corresponding region in the projection regions 150_1 and 150_2 is correspondingly increased. In this way, when the projection surface presents an arc shape or a wave shape, image warping caused by placing positions of the image capturing device 120 or the projection devices 110_1 and 110_2 can be corrected by adjusting the projection ratio, so as to resolve the problem of uneven imaging frame.

Figure 5:
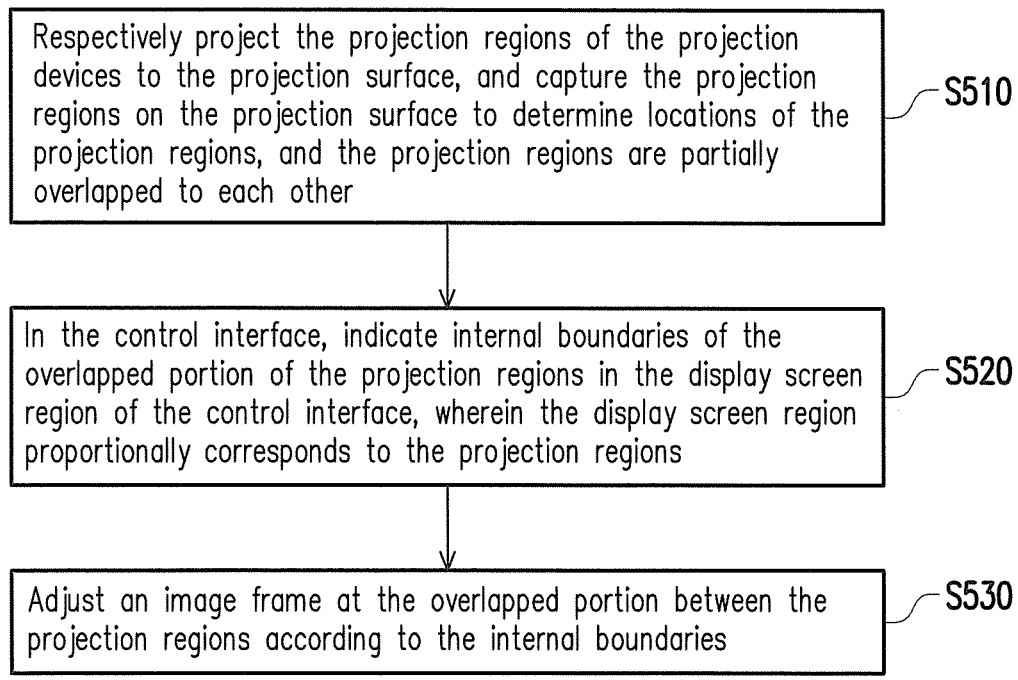
FIG. 5 is a flowchart illustrating a method for correcting projection region according to an embodiment of the invention.

FIG. 5 is a flowchart illustrating a method for correcting projection region according to an embodiment of the invention. Referring to FIG. 1 and FIG. 5, the method for correcting projection region of the embodiment is adapted to the projection display system 100 of FIG. 1, and various steps of the method for correcting projection region of the invention are described below with reference of various components in the projection display system 100.

In step S510, the projection regions 150_1 and 150_2 of the projection devices 110_1 and 110_2 are respectively projected to the projection surface 140, and the image capturing device 120 is used to capture images of the projection regions 150_1 and 150_2 on the projection surface 140 to determine locations of the projection regions 150_1 and 150_2, where the projection regions 150_1 and 150_2 are partially overlapped to each other. The step S510 corresponds to the steps S210-S240, i.e. the images generated in the step S510 are the same to the images generated in the steps S210-S240, and the projectors do not project new images, though the invention is not limited thereto, and new images (different to the images generated in the steps S210-S240) can be projected in the step S510.

In step S520, in the control interface of the computing device 160, internal boundaries of the overlapped portion of the projection regions 150_1 and 150_2 are indicated in the display screen region of the control interface, where the display screen region proportionally corresponds to the projection regions 150_1 and 150_2.

Figure 6A:
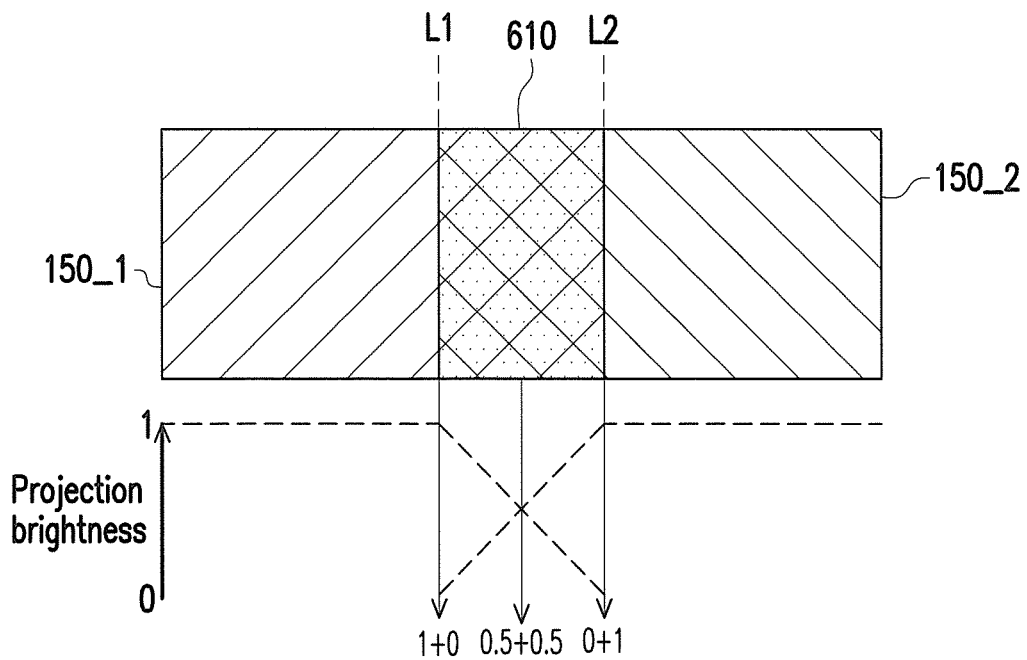
FIG. 6A is a schematic diagram of an overlapped portion of projection regions according to an embodiment of the invention.

For example, FIG. 6A is a schematic diagram of the overlapped portion of the projection regions according to an embodiment of the invention. In FIG. 6A, the projection regions of the projection devices 110_1 and 110_2 are respectively 150_1 and 150_2, Internal boundaries L1 and L2 defining an overlapped portion 610 are respectively set in the projection regions 150_1 and 150_2. In a corresponding brightness schematic diagram there below, the brightness has a range from 0 to 1, digits on the left represent the brightness of the projection region 150_1, and digits on the right represent the brightness of the projection region 150_2, which respectively represent a magnitude of the projection brightness of each projection region. As shown in the brightness schematic diagram of FIG. 6A, the projection brightness of the projection regions 150_1 and 150_2 is progressively decreased from the internal boundaries L2 and L1 to internal. For example, the projection brightness of the projection region 150_1 is progressively decreased from the internal boundary L2 to the internal boundary L1, and is decreased from 1 to 0. Moreover, since the overlapped portion 610 is between the internal boundaries L1 and L2, the projection brightness of the overlapped portion 610 (a sum of the brightness of the projection regions 150_1 and 150_2) is the same to the brightness of the other non-overlapped projection regions, and is evenly maintained to a fixed value (for example, 1).

Figure 6B:
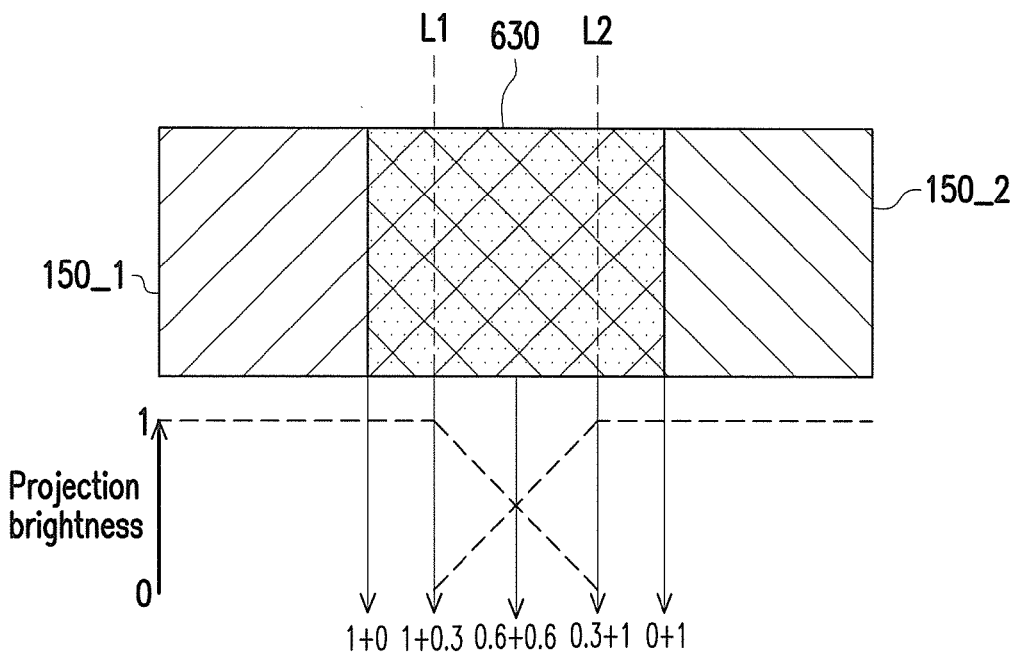
FIG. 6B is a schematic diagram of a bright band generated at an overlapped portion of the projection regions.

On the other hand, in FIG. 6B, when the overlapped portion 630 exceeds a range of the internal boundaries L2 and L1 of the projection regions 150_1 and 150_2, as shown in a brightness schematic diagram below the projection regions, the projection brightness of the projection regions 150_1 and 150_2 is progressively decreased from the internal boundaries L2 and L1 to internal. For example, the projection brightness of the projection region 150_1 is progressively decreased from the internal boundary L2 to the internal boundary L1, and is decreased from 1 to 0, though the projection brightness of the overlapped portion 630 cannot be maintained to the fixed value as the brightness of the non-overlapped projection regions (for example, a sum of brightness within the overlapped portion in the brightness schematic diagram is sequentially changed as 1, 1.3, 1.2, 1.3 and 1), such that an obvious bright band is produced in the projection regions. Namely, as the overlapped portion of the projection region 150_1 or 150_2 should be originally preset between the internal boundaries L1 and L2, since the user cannot determine the position of the overlapped portion of the projection region 150_1 or 150_2, the overlapped portion exceeds the internal boundaries L1 and L2, and the part with brightness progressively decreased to 0 should be originally located on a boundary line of the internal boundary L1 or L2, though now the boundary line of the internal boundary L1 or L2 has a brightness of 0.3, such that the superposed brightness is excessive (1+0.3) to cause the bright band.

Figure 6C:
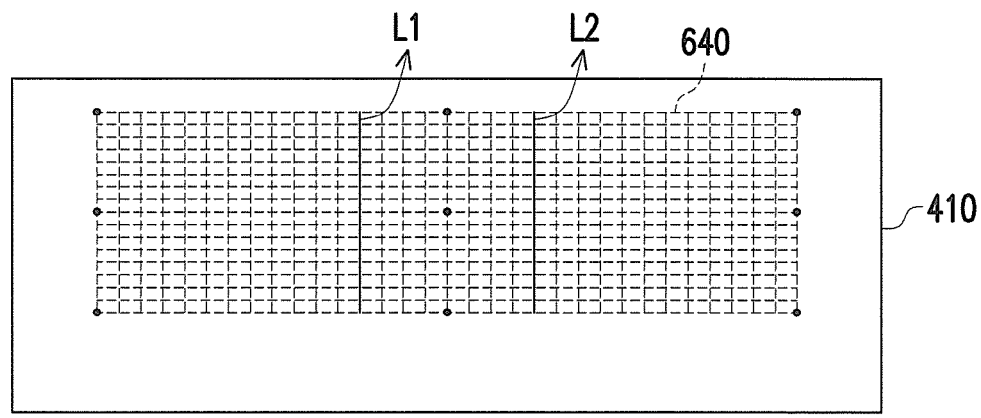
FIG. 6C is a schematic diagram of a display screen region according to an embodiment of the invention.

FIG. 6C is a schematic diagram of a display screen region 640 according to an embodiment of the invention. Referring to FIG. 1 and FIG. 6C, the display screen region 640 displayed on the control interface 410 of the computing device 160 proportionally corresponds to the projection regions 150_1 and 150_2. As shown in FIG. 6C, the computing device 160 indicates the internal boundaries L1 and L2 of the overlapped portion of the projection regions 150_1 and 150_2 in the display screen region 640 on the control interface 410 thereof. Referring back to FIG. 5, in the step S530, the computing device 160 adjust an image frame at the overlapped portion between the projection regions 150_1 and 150_2 according to the internal boundaries L1 and L2 indicated on the display screen region 640.

In detail, according to a method for correcting projection region described in an embodiment of the invention, when the overlapped portion of the projection regions has an obvious bright band phenomenon due to uneven brightness (shown in FIG. 6B), the user can operate on the control interface to adjust a position of the image frame at the overlapped portion between the projection regions 150_1 and 150_2 to be within the internal boundaries L1 and L2 of the projection regions 150_1 and 150_2, so as to avoid the bright band phenomenon produced on the image frame of the projection region, and improve uniformity of the projection brightness of the projection devices.

Figure 7A:
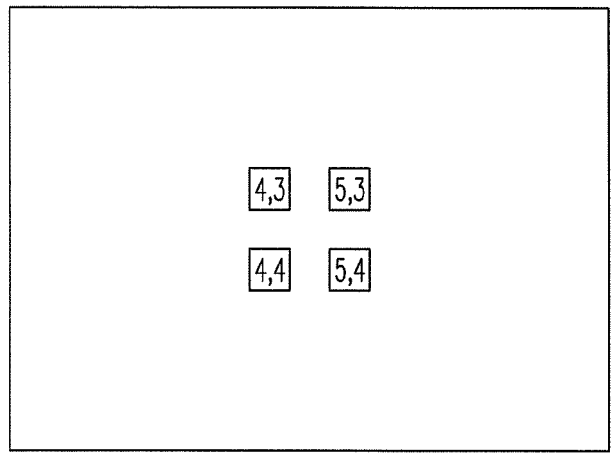
FIGS. 7A, 7B and 7C are schematic diagrams respectively illustrating image frames of the projection regions according to an embodiment of the invention.
Figure 7B:
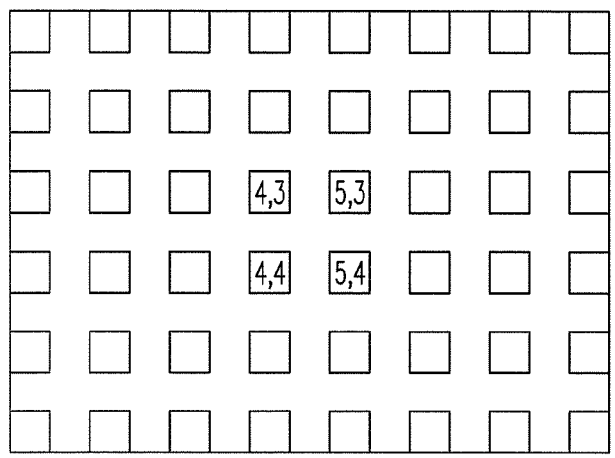
Figure 7C:
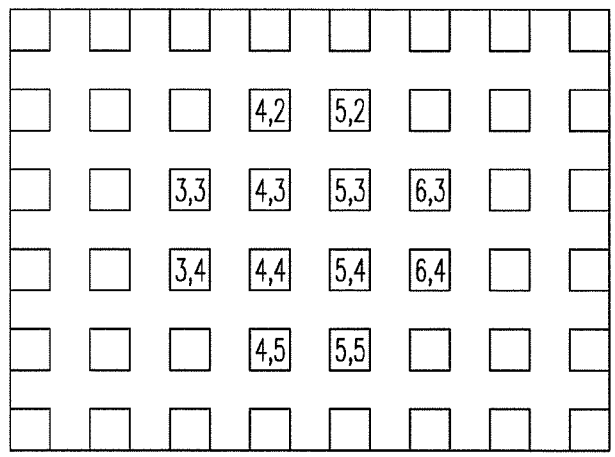

Moreover, FIGS. 7A, 7B and 7C are schematic diagrams respectively illustrating image frames 700, 710 and 720 of the projection regions according to an embodiment of the invention. FIGS. 7A-7C are used to describe a lattice point generation method in the steps S230-S240. Coordinate values of four lattice points arranged in a rectangle in the middle of the projection region are set in the computing device 160, and the image frame 700 is projected through the projection device, for example, the coordinate values of the four lattice points are respectively (4,3), (5,3), (4,4) and (5,4), though the invention is not limited thereto. Referring to FIG. 7A, taking the projection region 150_1 as an example, the computing device 160 can control the four lattice points arranged in rectangle in the middle of the image frame 700 that is projected to the projection region 150_1 by the projection device 110_1. The coordinate values of the four lattice points are respectively (4,3), (5,3), (4,4) and (5,4). Moreover, as shown in the image frame 710 of FIG. 7B, the computing device 160, for example, takes the fourth lattice points as reference points, and uses an interpolation method, etc. to proportionally increase the lattice points of the projection region 150_1 to fill the whole image frame to form a lattice point array.

In detail, as shown in the image frame 720 of FIG. 2C, the computing device 160 sequentially calculates the coordinate values of the lattice points in each lattice point array (for example, (3,3), (6,3), (3,4) and (6,4), etc.).

The steps S210-S260 are correction steps performed in the correction stage of the system, and the steps S310-S330 or the steps S510-S520 can be implemented in the step S260.

In the display stage of the projection display system, referring to FIG. 1 and FIG. 2 the computing device 160 provides an input image to the blending device 130, and the image control unit 134 in the blending device 130 warps the input image according to the input image and the projection device and image capturing device 2D coordinate array and the image capturing device 2D coordinate array stored in the memory unit 132, and provides the warped image to the projection devices 110_1 and 110_2 via the signal output units 136, and the projection devices 110_1 and 110_2 projects warped images to the projection surface 140 to generate an integral image frame. Moreover, the image warping refers to that the input image is converted into warped images corresponding to the projection device and image capturing device 2D coordinate array and the image capturing device 2D coordinate array, the number of the warped images corresponds to the number of the projection devices. For example, the projection display system has two projection devices, after the input image is warped, two warped images are respectively provided to the two projection devices. It is assumed that the projection devices are arranged to the left and to the right, the warped images form a left warped image and a right warped image corresponding to the projection devices arranged to the left and to the right, and the projection devices arranged to the left and to the right respectively project the left and right warped images to the projection plane to form an integral image, where the integral image can be a blended image, a concave image or a convex image after blending, a wave-shaped image, an overlapped image, etc.

In summary, by adding a plurality of control points and internal boundaries of the overlapped portion of the projection regions on the display screen region of the control interface, the user can use the control points used for controlling the projection ratio to manually adjust the warped image caused by a non-planar projection screen (for example, an arc or wave-shaped projection screen). Moreover, the user can also adjust the imaging frame on the projection regions according to the internal boundaries of the overlapped portion of the projection regions, so as to avoid unexpected image bright band. In this way, the user can dynamically adjust the imaging frame on the projection regions through the additionally increased functions on the control interface, so as to improve the projection quality. Moreover, by directly setting the final projection boundaries, the image capturing device is avoided to capture the image on the screen, so as to save a correction time.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents. Moreover, any embodiment of or the claims of the invention is unnecessary to implement all advantages or features disclosed by the invention. Moreover, the abstract and the name of the invention are only used to assist patent searching, and are not used for limiting the claims of the invention.

What is claimed is:

1. A projection display system, comprising:
a plurality of projection devices, respectively configured to project a plurality of projection regions to a projection surface;
an image capturing device, configured to capture an image of the projection regions on the projection surface;
a computing device coupled to the image capturing device and having a control interface, wherein the computing device is adapted to generate a projection device and image capturing device two-dimensional coordinate array according to the image of the projection regions having a plurality of lattice points captured by the image capturing device and a resolution coordinate of the computing device, and wherein the control interface is configured to set a projection boundary, and the computing device is adapted to generate an image capturing device two-dimensional coordinate array according to the projection boundary; and
a blending device, coupled to the projection devices and the computing device, configured to apply the projection device and image capturing device two-dimensional coordinate array and the image capturing device two-dimensional coordinate array to an input image to form a blending image.

2. The projection display system as claimed in claim 1, wherein
one of the projection devices is adapted to project the lattice points located in the middle area of a part of the projection regions, another one of the projection devices is adapted to project the lattice points located in the middle area of another part of the projection regions, and the image capturing device is adapted to capture the image having the lattice points.

3. The projection display system as claimed in claim 2, wherein
one of the projection devices is adapted to project the lattice points filling the remaining area of the image to a part of the projection regions, another one of the projection devices is adapted to project the lattice points filling the remaining area of the image to another part of the projection regions, and the image capturing device captures the image having the lattice point.

4. The projection display system as claimed in claim 1, wherein the projection boundary is manually set by a user.

5. The projection display system as claimed in claim 1, wherein the image capturing device two-dimensional coordinate array is calculated by the computing device according to the projection boundary and the resolution coordinate of the computing device.

6. The projection display system as claimed in claim 5, wherein the blending device further comprises:
   a memory unit, configured to store the projection device and image capturing device two-dimensional coordinate array generated by the computing device and the image capturing device two-dimensional coordinate array generated by the computing device;
   a signal output unit, configured to output an image signal; and
   an image control unit, coupled to the signal output unit and the memory unit, configured to generate a warped image according to the input image and the projection device and image capturing device two-dimensional coordinate array and the image capturing device two-dimensional coordinate array, and adapted to control the signal output unit to output the warped image.

7. The projection display system as claimed in claim 1, wherein the control interface comprises:
   a display screen region in the control interface, wherein the computing device is adapted to determine locations of the projection regions according to the image of the projection regions captured by the image capturing device, and the display screen region proportionally corresponds to the projection regions, and
   wherein a plurality of control points is set on the display screen region, and a projection ratio of an image frame displayed on the projection regions is dynamically adjusted by adjusting locations of the control points and a space between the control points.

8. The projection display system as claimed in claim 1, wherein the control interface is configured to set the projection boundary, and
   the projection regions are partially overlapped with each other;
   the computing device is adapted to determine locations of the projection regions according to the image of the projection regions captured by the image capturing device;
   the control interface has a display screen region,
   wherein a boundary of an overlapped portion of the projection regions is indicated on the display screen region, and the computing device is adapted to adjust the image frame of the overlapped potion of the projection regions according to the boundary.

9. A projection method, comprising:
   respectively projecting a plurality of projection regions to a projection surface, and capturing the projection regions on the projection surface;
   generating a projection device and image capturing device two-dimensional coordinate array according to an image of the projection regions having a plurality of lattice points captured by an image capturing device and a resolution coordinate of a computing device;
   setting a projection boundary in a control interface, and forming an image capturing device two-dimensional coordinate array according to the projection boundary; and
   applying the projection device and image capturing device two-dimensional coordinate array and the image capturing device two-dimensional coordinate array to an input image to form a blending image.

10. The projection method as claimed in claim 9, wherein the step of respectively projecting the projection regions to the projection surface, and capturing the projection regions on the projection surface comprises:
    projecting the lattice points located in the middle area of the image, and capturing the image having the lattice points.

11. The projection method as claimed in claim 10, wherein the step of respectively projecting the projection regions to the projection surface, and capturing the projection regions on the projection surface comprises:
    projecting the lattice points filling the remaining area of the image, and capturing the image having the lattice points.

12. The projection method as claimed in claim 9, wherein the projection boundary is set by a user.

13. The projection method as claimed in claim 10, wherein the image capturing device two-dimensional coordinate array is formed according to the projection boundary and the resolution coordinate of the computing device.

14. The projection method as claimed in claim 9, wherein the step of setting the projection boundary in the control interface comprises:
    determining locations of the projection regions according to the projection regions, wherein the projection regions are adjacent to or partially overlapped to each other;
    setting a plurality of control points on a display screen region in the control interface, wherein the display screen region proportionally corresponds to the projection regions; and
    dynamically adjusting a projection ratio of an image frame displayed on the projection regions by adjusting locations of the control points and a space between the control points.

15. The projection method as claimed in claim 9, wherein determining locations of the projection regions according to the projection regions, wherein the projection regions are partially overlapped to each other;
    indicating a boundary of an overlapped portion of the projection regions in a display screen region of the control interface, wherein the display screen region proportionally corresponds to the projection regions; and
    adjusting an image frame of the overlapped portion between the projection regions according to the boundary.

* * * * *